United States Patent [19]

Düppre

[11] 4,313,508
[45] Feb. 2, 1982

[54] MAIL-WEIGHING MACHINE

[75] Inventor: Theo Düppre, Kaiserslautern, Fed. Rep. of Germany

[73] Assignee: Kuno Sauer, Sulzbach, Fed. Rep. of Germany

[21] Appl. No.: 90,005

[22] Filed: Oct. 31, 1979

[30] Foreign Application Priority Data

Nov. 3, 1978 [DE] Fed. Rep. of Germany ....... 2847755

[51] Int. Cl.³ ...................... G01G 23/22; G01G 19/52
[52] U.S. Cl. ....................................... 177/25; 177/245
[58] Field of Search .................. 177/25, 245; 364/466, 364/567

[56] References Cited

U.S. PATENT DOCUMENTS 1,067,213  7/1913  Christopher .................... 177/245 X
4,051,913 10/1977  Gudea ................................ 177/25
4,180,856 12/1979  Check, Jr. et al. ............... 177/25 X Primary Examiner—George H. Miller, Jr.
Attorney, Agent, or Firm—Spensley, Horn, Jubas & Lubitz

[57] ABSTRACT

In mail-weighing machines the values determined by a weight measuring device (20) are supplied in digital form to a programmable set-value store (27). The set-value store (27) and the codifier (23) supplying the digital, measured values are connected to the display device (24) via a first multiplexer (26) which alternatively supplies to the display device (24) the output signal (25) of the codifier (23) or that of the set-value store (27). In a manually-actuable selector device (38), different postage tariffs can be set which conform to different groups of addresses of the set-value store. The output of the first multiplexer (26) is one input to a second multiplexer (31). A time clock (32) or other source of information is connected to the other input of the second multiplexer (31). A sensor (34) controls the second multiplexer (31) so that the second multiplexer (31) so that the second multiplexer (31) supplies the signal from the first multiplexer (26) to the display device (24) during a weighing operation and the signal from the time clock (32) at other times.

18 Claims, 1 Drawing Figure

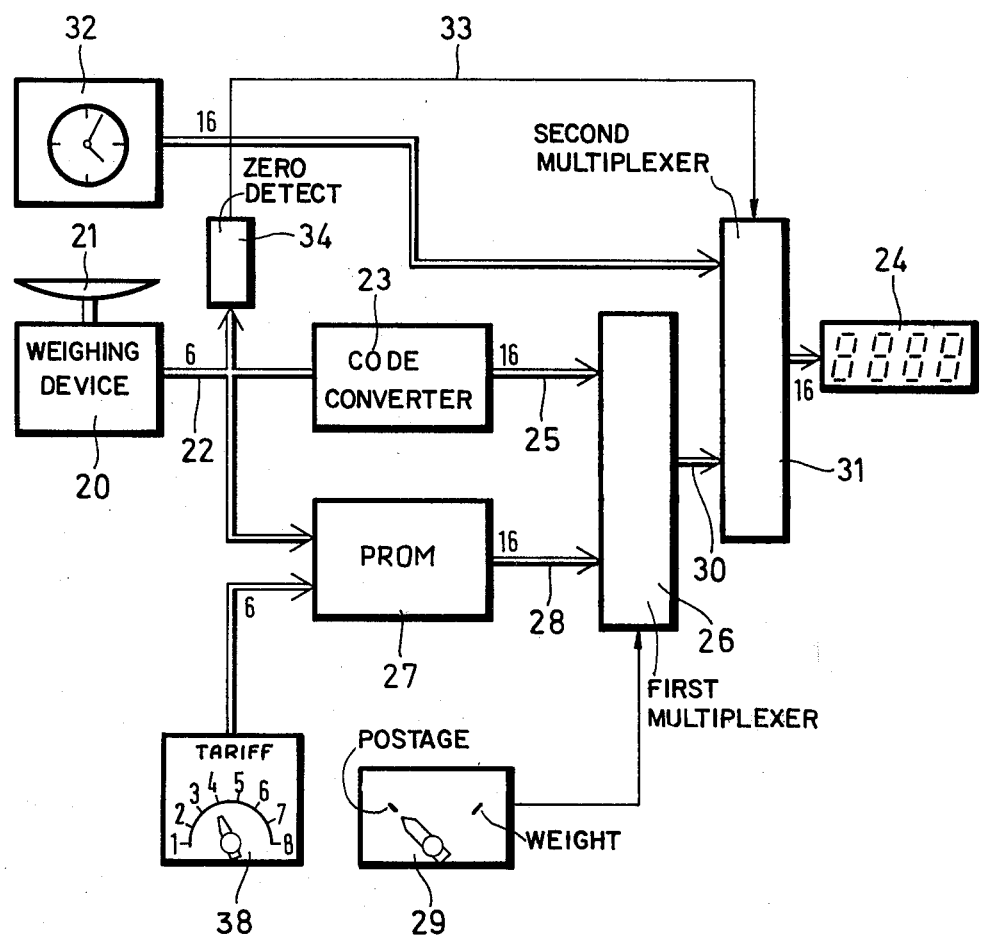

MAIL-WEIGHING MACHINE

The invention relates to a mail-weighing machine with a weight-measuring device which is connected through a codifier with a digital display device.

To determine the postal rate for letters, small parcels, etc., it is known to use letter scales which indicate the weight of the letter or parcel sent by post. The postage for the forwarding must subsequently be ascertained in a table in accordance with the appropriate tariff. The tariffs for normal letters sent by post, registered letters sent by post, printed matter and the like, are itemized in the table for the individual weight grades and groups of territories. The singling of the correct amount of postage out of the table presents a considerable source of error. The letter or parcel sent by post is returned when the amount of postage applied is too low, whereby there are increased costs and delays. The payment of too high an amount of postage denotes an unnecessary expense for the sender. In the case of the usual analog-operating reading devices, in which a pointer indicates the weight value on an indicating scale, errors in reading, moreover, frequently occur.

In order to avoid such errors in reading there are known mail-weighing machines which indicate the weight in digital form on a display device. Such a digital readout has, moreover, the advantage that in cases of doubt it is clearly perceptible whether the weight is below or above the boundary value which separates two tariff grades from one another. Such a mail-weighing machine with digital readout does not however, save the manual determination of the amount of postage in the postage table.

The object of the invention is to provide a mail-weighing machine of the initially-stated kind with which the errors which arise through the manual determination of the amount of postage, are eliminated.

For the achievement of this object, provision is made, in accordance with the invention, for the values determined by the weight-measuring device to be supplied in digital form to a programmable set-value store and for the codifier and the set-value store to be connected with the display device through a multiplexer which alternatively transmits the output signal of the codifier or that of the set-value store to the display device.

The set-value store contains the values of the postage table. It is triggered with the output signals of the weight-measuring device and thereupon transmits to the display device the amount of postage for the measured weight. The user can therefore read the amount of postage in dollars and cents off directly at the display device.

What is achieved by the multiplexer is that the weight or the amount of postage can be indicated. The indication of weight results from by-passing the set-value store since the weight measuring device controls the display device directly through the codifier.

In an advantageous development of the invention, the set-value store may be connected with a manually-actuable selector device at which there can be set the different postal tariffs which accord with different groups of addresses of the set-value store. The set-value store therefore contains not only one single amount of postage for each group by weight, but several amounts of postage appropriate to the individual classes of tariff. The user can set up at the selector device the respective methods of dispatch, for example airmail, registered mail, printed matter and the group of territories, so that regard is already had for these factors with the indication of the amount of postage. Thereby, errors can crop up only in so far as an incorrect tariff has been set up at the selector device. The user can therefore concentrate on the setting-up of the correct tariff. The correct amount of postage can then be read off directly at the display device.

There is preferably provided an additional source of information which supplies data to be displayed at the display device and is connected with the input of a second multiplexer, and the output of the first multiplexer is connected with a second input of the second multiplexer, the output of the second multiplexer controlling the display device.

In this connection, a multiplexer is a multiway switch, which selectively switches through to the output one of two inputs with more than one digit. The additional source of information may, for example, be a time clock which indicates the clock time and/or the date. This additional information may also be displayed at the display device, if the user so desires. The additional information need not necessarily consist exclusively of numerals. It may also be a question of alphanumerical data when the display device is suitable for an alphanumerical reading.

The additional information is preferably always displayed when the weight-measuring device is not loaded. Normally, the display device would in this event always show the value zero which is of no advantage for the user. In order to replace this uninteresting indication of the zero-weight by a meaningful reading, the second multiplexer may, in an advantageous development of the invention, be controlled by a sensor which determines a loading of the weight-measuring device and connects through to the display device, in the unloaded condition, the output of the additional source of information and, in the loaded condition, the output of the first multiplexer. The sensor may, for example, be a zero-detector connected to the weight-detector and which gives out a signal only when the output value of the weight-measuring device is "zero". The signal of the weight detector controls the second multiplexer in the sense that the weight or the appropriate postage is displayed only when it differs from zero. Alternatively, the sensor may comprise a photo-electric cell which determines the presence of an object on the weight-measuring device.

One embodiment of the invention is described hereinafter in more detail with reference to the single FIGURE of the drawing.

There is shown schematically in the drawing a block diagram of the postage scale.

The conductors indicated by double lines denote a conductor bundle or bundle of channels to which is transmitted at any given time binary information with more than one digit. The number of conductors or channels is indicated at any given time by the numerals 6 and 16.

The weight-measuring device 20 has a balance pan or plate 21 on which the mail to be weighed is placed. The weight-measuring device may support a force-detecting element which converts the weight in analog electrical signals, or a motion pickup which determines the lowering of the balance pan 21 and converts in analog-electrical signals. The analog-signals are converted into digital signals, in the present exemplary embodiment within the weight-measuring device 20 which contains a digital-analog converter. These digital signals are given out in Gray-code to the output conductors 22 and supplied to a code converter 23 which converts the signals occurring in Gray-code into signals according to the BCD-code. As the display device 24 has four digital positions in the present exemplary embodiment and four bits are required for each digital position, the code converter 23 has altogether 16 output conductors 25 of which at any given time four output conductors define the value of a digit. The output conductors 25 lead to the first input of the first multiplexer 26.

The output signals of the conductor bundle 22 are moreover supplied to a programmable set-value store 27 (PROM). The set-value store contains in a number of storage addresses which can be called in the individual postage amounts for the different weight classes according to tariffs. At a selector switch 38 with 6-position output, which is connected with the address input of the set-value store 27, there can be set up the respective kind of tariff, while the weight or the class of weight is supplied to further address inputs. With a change of tariff, the set-value -store 27 must either be replaced or reprogrammed. The set-value store 27 gives out at its output the postage amount in BCD-code as a function of the measured weight or weight scan and of the set tariff. As the postal rate information is also four-digit, the output 28 has 16 conductors (four for each digit). The output 28 is connected with the second input of the multiplexer 26.

The multiplexer 26 is a multi-way switch which, as a function of the position of a selector switch 29, switches through to its output either the signals of the conductor bundle 25 or the signals of the conductor bundle 28. If the selector switch 29 is at "postal rate", the 16 binary signals which represent the amount of postage are therefore at the output 30. If the selector switch is at "weight", there are at the output 30 those 16 binary signals which represent the weight of the mail.

The output 30 of the first multiplexer 26 is connected with one input of a second multiplexer 31 which has a function similar to that of the first multiplexer 26. In the case of the second multiplexer 31 also, it is a question also of a multi-way switch. As the second input of the multiplexer 31 is the 16 digit output signal of an additional source 32 of information, in the case of which in the present instance it is a question of a time clock with digital time output.

The second multiplexer 31 is controlled through a conductor 33 from a zero-value detector 34. To the zero-value detector 34 are supplied the output signals 22 of the weight-measuring device 20.

When the weight-measuring device 20 is not loaded, the output signal consists of six zeros. The zero-value detector 34 recognizes the presence of six zeros and thereupon sends through conductor 33 to the second multiplexer 31 a signal through which the output of the time clock 32 is switched through to the input of the indicating device 24. When the weight-measuring device 20 is not loaded, the clock time is therefore displayed in digital form. Possibly there may take place in known manner at specific intervals of time a fade-in of the date.

If this weight to be measured differs from zero, the second multiplexer switches the signals of its input 30 through to the display device 24. As a function of the position of the selector switch 29, therefore, either the weight cropping up at the conductor bundle 25, or the postage amount cropping up at the conductor bundle 28, is displayed.

I claim:

1. A mail-weighing machine with a weight-measuring device which is connected to a codifier with a digital display device, comprising:
   a programmable set-value store containing postage amounts for corresponding different mail weights, the values determined by the weight-measuring device being supplied in digital form to said set-value store, said set-value store thereby producing a digital output signal indicative of the postage amount for the supplied value;
   a multiplexer, the codifier and the set-value store being connected with the display device through said multiplexer which alternatively transmits the output signal of the codifier or that of the set-value store to the display device; and
   an additional source of information which delivers information to be displayed to the display device and is connected with an input of a second multiplexer, the output of the first multiplexer being connected with a second input of the second multiplexer, the output of the second multiplexer controlling the display device.

2. A mail-weighing machine according to claim 1 wherein the set-value store is connected with a manually-actuable selector device which can be set to select different postage tariffs which conform to different groups of addresses of the set-value store.

3. A mail-weighing machine according to claim 1 or 2 wherein the additional source of information is a digital clock with binary time output.

4. A mail-weighing machine according to claim 1 or 2, wherein the second multiplexer is controlled from a sensor which ascertains loading of the weight-measuring device and, in the unloaded condition, connects the output of the additional source of information through to the display device, and, in the loaded condition, connects the output of the first multiplexer through to the display device.

5. A mail-weighing machine according to claim 4, wherein the sensor is a zero-value detector connected with the weight-measuring device.

6. A mail-weighing machine according to claim 4, wherein the sensor comprises a photo-electric cell.

7. A mail-weighing machine having a scale providing a digital output indicative of the weight of mail placed thereon, and having a digital display device for selectively displaying the requisite amount of postage for said mail, comprising:
   a programmable memory storing at least one set of postage values for different mail weights at corresponding different storage locations, the digital output of said scale being used as the address for accessing said memory and being coded so that the postage value corresponding to the indicated mail weight is read out from the memory for display on said device;
   a selector switch, and first multiplexer means for selectively providing to said display device, in accordance with the setting of said selector switch, a first signal corresponding to said digital output of said scale and indicating the weight of said mail, or a second signal corresponding to the postage value read out from said memory, so that operation of said selector switch will cause either the weight or the postage value of said mail to be displayed on said device;

zero value detector means, responsive to the output of said scale, for producing a signal if the scale output corresponds to a weight of zero, indicating that no mail is on said scale;

clock means for providing a digital signal indicative of the time of day; and second multiplexer means, connected between said first multiplexer means and said display device and controlled by the signal from said zero value detector, for providing to said display the time-indicative signal from said clock means if said zero value detector indicates that the scale output represents zero weight, and for providing to said device the output from said multiplexer means when said zero value detector indicates that the scale output represents non-zero weight.

8. Apparatus according to claim 7 wherein said memory contains at least two different sets of postage values, each set of postage values corresponding to a different tariff, together with:

tariff selection switch means for selecting a partiular tariff and for providing a digital code corresponding to the selected tariff, said digital code together with the digital output of said scale together comprising the address utilized to access said memory.

9. For a mail scale apparatus including a scale which supplies a weight signal to a codifier, whose output signal is coupled to a digital display, the improvement wherein;

said scale is configured to generate said weight signal in digital form, and comprising:

memory circuitry storing prespecified values, receiving as retrieval address input said digital weight signal, and generating a corresponding value output signal, a first multiplexer, receiving as inputs said codifier output signal and said value output signal, and selectably providing as output either said codifier output signal or said value output signal, said first multiplexer output being coupled to said digital display;

information generation means for supplying an information data signal; and a second multiplexer, receiving as inputs said first multiplexer output and said information data signal, and selectably providing one of said second multiplexer inputs as an output to said digital display.

10. A mail scale apparatus according to claim 9 further comprising:

a selector, manually actuable to select a desired postage tariff, and generating a corresponding selector signal to said memory circuitry, said memory circuitry utilizing said selector signal to designate which of different groups of said values will be retrievable.

11. A mail scale apparatus according to claim 9, or 10 further comprising:

a sensor, receiving said digital weight signal and coupled to said second multiplexer, to cause said second multiplexer to select said information data signal as the output when said scale is unloaded and said first multiplexer as the output when said scale is loaded.

12. A mail-weighing machine with a weight-measuring device and a digital display device comprising:

a programmable set-value store containing postage amounts for corresponding different mail weights and connected with a manually-actuable selector device which can be set to select different postage tariffs which conform to different groups of addresses of the set-value store, the value determined by the weight-measuring device being supplied in digital form to said set-value store, said store in response thereto producing a digital output signal indicative of the postage amount for the supplied value, said postage amount to be displayed on said display device;

an additional source of information which delivers an information signal to be displayed to the display device; and a multiplexer controlled from a sensor which ascertains loading of the weight-measuring device and, in the unloaded condition, connects the output of the additional source of information through to the display device, and, in the loaded condition, connects the output of the set-value store through to the display device.

13. A mail-weighing machine according to claim 12 wherein the sensor is a zero-value detector connected with the weight-measuring device.

14. A mail-weighing machine according to claim 12 wherein the sensor comprises a photo-electric cell.

15. A mail-weighing machine having a scale and a digital display device for selectively displaying the requisite amount of postage for said mail or the time of day, comprising:

a programmable memory storing at least one set of postage values for different mail weights at corresponding different storage locations, the digital output of said scale being used as the address for accessing said memory and being coded so that the postage value corresponding to the indicated mail weight is read out from the memory for display on said device;

zero-value detector means, responsive to the output of said scale, for producing a signal if the scale output corresponds to weight of zero, indicating that no mail is on said scale;

clock means for providing a digital signal indicative of the time of day; and multiplexer means connected between said programmable memory, said clock means and said display device and controlled by the signal from said zero value detector, for providing to said display the time indicative signal from said clock means if said zero value detector indicates that the scale output represents zero weight, and for providing to said display device the output from said programmable memory representing the postage value corresponding to the mail weight when said zero value detector indicates that the scale output represents non-zero weight.

16. A mail-weighing device according to claim 15 wherein said memory contains at least two different sets of postage values, each set of postage values correspond to a different tariff, together with:

tariff selection switch means for selecting a particular tariff and for providing a digital code corresponding to the selected tariff, said digital code together with the digital output of said scale together comprising the address utilized to access said memory.

17. For a mail scale apparatus which includes a scale configured to generate a weight signal in digital form, the improvement comprising:
- memory circuitry storing prespecified values, receiving as retrieval address input said digital weight signal, and generating a corresponding value output signal;
- information generation means for supplying an information data signal;
- a multiplexer, receiving as inputs said value output signal and said information data signal and selectively providing one of said multiplexer inputs as an output to said digital display; and
- a sensor, receiving said digital weight signal and coupled to said multiplexer, to cause said multiplexer to select said information data signal as the output when said scale is unloaded and said value output signal as the output when said scale is loaded.

18. For a mail scale apparatus which includes a scale configured to generate a weight signal in digital form, the improvement comprising:
- memory circuitry storing prespecified values, receiving as retrieval address input said digital weight signal and generating a corresponding value output signal;
- information generation means for supplying an information data signal;
- a multiplexer, receiving as inputs said value output signal and said information data signal and selectively providing one of said multiplexer inputs as an output to said digital display;
- a selector, manually actuable to select a desired postage tariff, and generating a corresponding selector signal to said memory circuitry, said memory circuitry utilizing said selector signal to designate which of different groups of said values will be retrievable; and
- a sensor, receiving said digital weight signal and coupled to said multiplexer, to cause said multiplexer to select said information data signal as the output when said scale is unloaded and said value output signal as the output when said scale is loaded.

* * * * *